Figure 1:
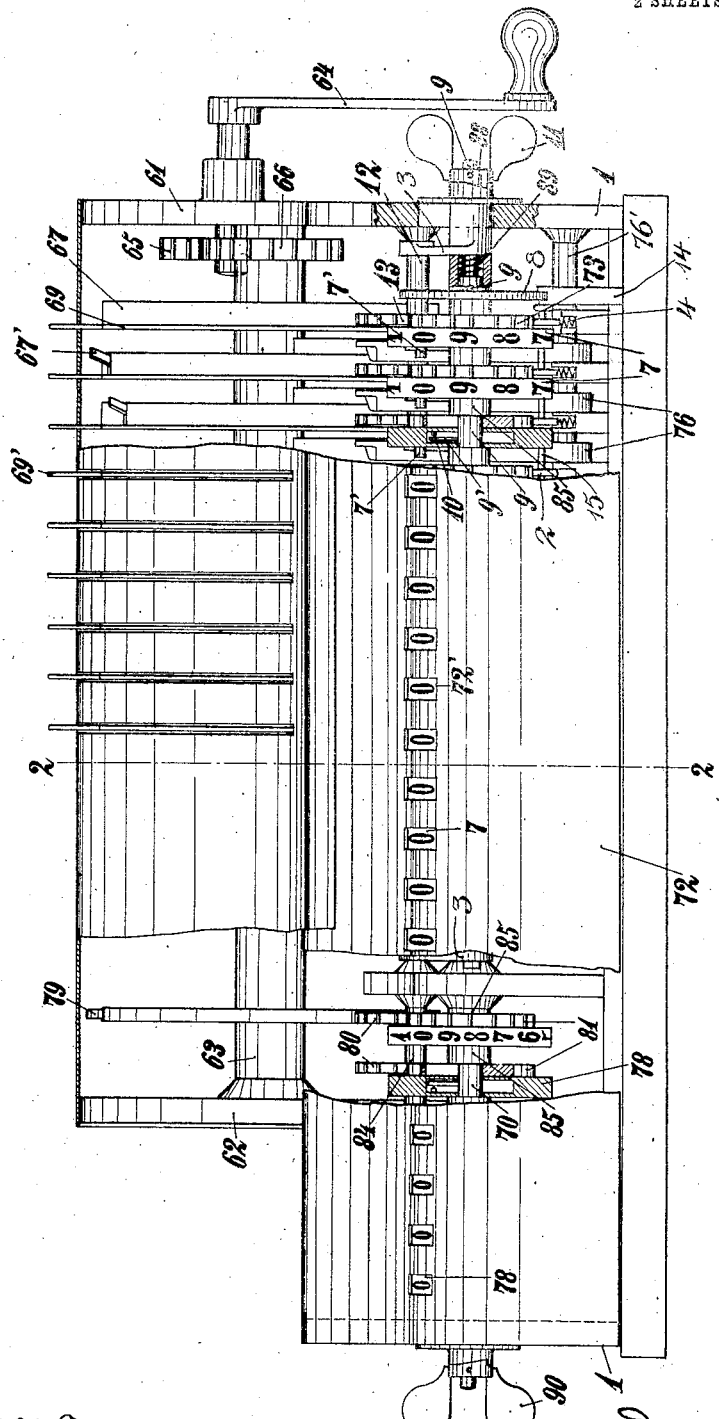

F. TRINKS.
DEVICE FOR PREVENTING THE OVERTHROW OF GEARS.
APPLICATION FILED SEPT. 11, 1911.

1,088,485.

Patented Feb. 24, 1914.

2 SHEETS—SHEET 1.

F. TRINKS.
DEVICE FOR PREVENTING THE OVERTHROW OF GEARS.
APPLICATION FILED SEPT. 11, 1911.

1,088,485.

Patented Feb. 24, 1914.
2 SHEETS—SHEET 2.

UNITED STATES PATENT OFFICE.

FRANZ TRINKS, OF BRUNSWICK, GERMANY.

DEVICE FOR PREVENTING THE OVERTHROW OF GEARS.

1,088,485. Specification of Letters Patent. Patented Feb. 24, 1914.

Application filed September 11, 1911. Serial No. 648,765.

*To all whom it may concern:*

Be it known that I, FRANZ TRINKS, engineer, a subject of the Duke of Brunswick, residing at Brunswick, Duchy of Brunswick, Empire of Germany, have invented certain new and useful Improvements in Devices for Preventing the Overthrow of Gears, of which the following is a specification.

My invention relates to improvements in devices for preventing the overthrow of gears, and more particularly to spring actuated devices which are combined with gear wheels for the purpose of preventing the same from being overthrown after being released from their driving means. Devices of this kind are used for example in combination with the gear wheels of calculating machines in order to arrest the same upon their disengagement from their driving members. In such cases the arresting means consist of a spring actuated pawl which engages in the teeth of the driven gear wheel, as is shown for example in the patents of the United States Nos. 928,083, 953,622, and 957,062. In the operation of the gear wheels engaged by an arresting device of the character referred to the resistance of the gear wheels is increased by the spring actuated pawls and an objectionable noise is produced. In cases where the number of the wheels to be simultaneously rotated is large, as is the case for example in calculating machines, the resistance of the mechanism is very large. In order to reduce the resistance of the gears and the noise caused by the operation thereof it has been suggested to release the arresting devices when rotating the gears and to hold the same in released position while rotating the gears (see Patent No. 957,062), or to rock the arresting means and the rear abutments of their springs out of operative position during such rotation of the gears (see German Patent No. 208,811). However these constructions are complicated and require much space.

The object of my improvements is to provide means of the character described which are more simple in construction. And with this object in view my invention consists in rocking or shifting the gears themselves out of normal position sufficiently to bring the same out of engagement with their arresting devices, and providing means coöperating with the arresting devices to prevent the same from following the rocked or shifted gears under the action of their springs. Such means may either be provided separately for each arresting device, or they may be common to all the arresting devices.

In order that my invention may more clearly be understood an example embodying the same has been shown in the accompanying drawings in which the same letters of reference have been used in all the views to indicate corresponding parts.

Figure 2:
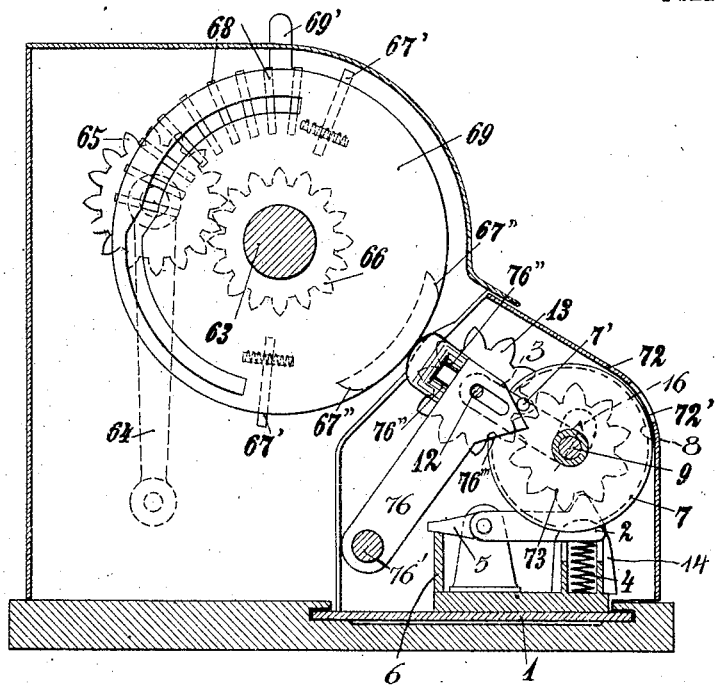

In said drawings—Figure 1, is a front view of a calculating machine of known construction with its casing partly removed and illustrating an example of a gearing in which my invention may be embodied, Fig. 2, is a vertical cross-section taken on the line 2—2 of Fig. 1.

In describing the invention reference will be had to a calculating machine provided with the improved arresting mechanism. But I wish it to be understood, that my invention is not limited to the combination of the arresting means with the gearing of a calculating machine, and that it may advantageously be used in other combinations. It will also be understood, that my invention is not limited to the construction of the arresting devices shown in the drawings, and that various changes may be made in the construction of parts within the gist of my invention.

Reference will now be had to the drawings.

A rotary shaft 63, mounted in a pair of side walls 61 and 62, is operatively connected with the machine crank 64 through spur gears 65 and 66, and it carries a plurality of setting disks 67 each of which is provided with nine radially shiftable teeth 68, engaged by a cam disk 69. In front of the said setting mechanisms 67, 68, 69, 69', numeral wheels 7 are loosely mounted on a shaft 9 disposed parallel to the shaft 63. Each numeral wheel, the numerical characters of which are visible through a peep hole 72' in a cover 72, has a spur gear 73 which is in mesh with the teeth of a transmission wheel 13, loosely mounted on a shaft 12. The said transmission wheels 13 are located in the plane of the radially shiftable teeth 68 of the setting disks 67.

Carrying means are provided between consecutive numeral wheels. In the example illustrated the counting wheels 7 are provided with hammer-shaped carrying levers 76, loosely mounted on a shaft 76' disposed parallel to the axis 9. The levers 76 extend with their free upper ends 76''' in known manner in the path of pins 7' of the numeral wheels 7, whereby the levers 76 are rocked, when the numeral wheels pass from their "9" position into their "0" position, or vice versa. Thereby a cam face 76'' of the rocking lever 76 is thrown into the path of laterally shiftable teeth 67' of the coöperating setting disk 67, adapted to coöperate, when shifted, with the transmission wheel 13 coöperating with the numeral wheel 7 of the next higher order. Cam faces 67'' rock the levers 76 into their normal positions shown in Fig. 2.

At the left of the registering mechanism 7 a second registering mechanism 78 is provided for counting the revolutions of the machine crank, which revolutions counting mechanism is actuated from the shaft 63 by means of a single tooth wheel 79 advancing a spur gear 80. Each of the numeral wheels is connected with a gearing 81, and all the gear wheels 80 meshing with the gearings 81 are loosely mounted on a shaft 84 disposed parallel to the shaft 70 of the registering mechanism 78.

Both registering mechanisms 7 and 78 are provided with resetting mechanisms adapted to set the numeral wheels into their zero positions. At its outer end the shaft 9 carries a nut 11, and within each of the numeral wheels 7 it is provided with a radial pin 9', coöperating with an abutment 10 of the numeral wheels 7. Upon rotation of the shaft 9 by means of the nut 11 the shaft 9 is shifted laterally against the action of a spring 89 by means of a cam face 88, so that the pins 9' are shifted into the path of the abutments 10 whereby the wheels 7 are turned to their zero positions. Resetting mechanisms of the same construction are provided on the shaft 70 which carries a nut 90 at its outer end. Short sleeves 85 prevent the axial displacement of the wheels 7 and 78.

Referring now to the parts of the machine to which my invention more particularly relates, reference will be had to Figs. 3 and 4 of the drawings in which the preferred form of my arresting devices and the means for temporarily rendering the same inoperative are shown. As shown the numeral wheels 7 (and where a second registering mechanism is provided) the numeral wheels 78, and their carrying levers 76 are mounted on a carriage 1 which is movable in a direction parallel to the axis 63. Coöperating with the said numeral wheels 7 (or 78) are spring actuated arresting pawls 2 which have a rocking support on a shaft 15 and are in engagement with the teeth of the gear wheels 73 (or 81) which are rigidly secured to the numeral disks 7 (or 78). By the action of their springs 4 the pawls 2 prevent the numeral wheels from being overthrown upon the release of the transmission wheels 13 (80) from their driving gears 68 (79). When resetting the numeral disks 7 (or 78) by means of the thumb nuts 11 (or 90) the resistance of all the springs 4 must be overcome, so that a considerable force must be exerted by the operator on the thumb nuts by reason of their small leverage. This is inconvenient particularly where the machine is frequently used. Besides the arresting pawls cause a vehement trembling of the machine and an objectionable rattling noise. These objections are effectively avoided by my improved mechanism. For this purpose the shaft 12, which carries the transmission gears 13 coöperating with the gear wheels 73 is equipped with two arms 3 which are rigidly mounted thereon and carry the shaft 9 of the wheels 73. The pawls 2 are formed with arms 5 which extend rearward therefrom and are adapted to bear on projections 6 provided on the carriage, whereby the pawls are prevented from being thrown upward by their springs upon the disengagement of the gear wheels 73 from the pawls 2.

If it is desired to rotate the wheels 73 without arresting the same the shaft 9 is first shifted in the direction of the arrow 16 shown in Fig. 3 until the pawls 2 are out of engagement with the gear wheels 73, whereupon rotation begins. As the gear wheels 73 are always in engagement with the transmission wheels 13 they can not assume a wrong position relatively to the gears 13.

The rocking of the gears 7 and 73 can be effected either by hand or automatically from any suitable member, for example from the resetting shaft 9 which for this purpose may be provided with a cam disk 8 riding upon rotation of the shaft 9 on a projection 14 of the carriage, so as to lift the resetting shaft 9.

Where a large number of gear wheels 73 is provided the projections 6 may be constructed in the form of a rail which is common to all the pawls 2, as is shown in Fig. 4, in which the rail has been indicated by the numeral 6'.

I claim herein as my invention:

1. In a gearing, the combination of a shiftable and rotatable member, a device adapted to prevent the member from being overthrown and to permit movement thereof, said device being positively held in normal position when the member is shifted therefrom, and means for shifting said member out of engagement with said device.

2. In a gearing, the combination of a shiftable and rotatable member, a device adapted to prevent the member from being overthrown and to permit movement thereof, means for shifting said member out of engagement with said device, and positive resisting means for said device in normal position when moving the member out of engagement therewith.

3. In a gearing, the combination of a shiftable and rotatable gear wheel, a spring actuated device coöperating with said gear wheel and adapted to prevent the same from being overthrown and to permit rotation thereof, means for shifting said gear wheel out of coöperation with said spring actuated device, and means for preventing said spring actuated device from following the gear wheel when being thrown out of coöperation with the spring actuated means.

4. In a calculating machine, the combination with the setting mechanism, and registering mechanism, a shiftable gear wheel adapted to transmit values from said setting mechanism to said registering mechanism, a spring actuated pawl adapted to engage said gear wheel to prevent overturning of the latter, means to limit the movement of said pawl toward the gear wheel, and means to move said gear wheel out of engagement with the pawl.

5. In a calculating machine, the combination with the setting mechanism, and registering mechanism, of a plurality of shiftable gear wheels adapted to transmit values from said setting mechanism to said registering mechanism, spring actuated pawls adapted to engage said gear wheels, means common to all the pawls to limit the movement of said pawls toward the gear wheels, and means to swing said gear wheels out of and into engagement with the pawls.

6. In a calculating machine, the combination of the setting mechanism, a numeral wheel, a gear wheel connected therewith, a resetting shaft loosely supporting said numeral wheel and gear wheel, and resetting means coöperating with said shaft and numeral wheel, a spring actuated pawl engaging said gear wheel, and permitting rotation thereof and adapted to prevent the same from being overthrown, means to limit the movement of said pawl toward the gear wheel and a cam disk secured to said resetting shaft and adapted upon rotation of said shaft to swing the gear wheel out of engagement with said pawl.

In testimony whereof I have hereunto set my hand in presence of two subscribing witnesses.

FRANZ TRINKS.

Witnesses:
WILHELM LEHRKE,
JULIUS SECKEL.